United States Patent [19]

Hobes et al.

[11] Patent Number: 4,883,853

[45] Date of Patent: Nov. 28, 1989

[54] COPOLYMERS OF ETHYLENE AND 2,4,4-TRIMETHYLPENTENE-1

[75] Inventors: John Hobes, Dinslaken; Wolfgang Payer, Wesel; Ludger Bexten, Hünxe, all of Fed. Rep. of Germany

[73] Assignee: Ruhrchemie Aktiengesellachaft, Fed. Rep. of Germany

[21] Appl. No.: 55,722

[22] Filed: May 29, 1987

[30] Foreign Application Priority Data

Jun. 26, 1986 [DE] Fed. Rep. of Germany ....... 3621394

[51] Int. Cl.$^4$ .................... C08F 210/02; C08F 210/14
[52] U.S. Cl. ...................................... 526/329; 526/87; 526/290; 526/331; 526/332; 526/348.2; 526/913
[58] Field of Search ............... 526/348.2, 348.7, 87, 526/329, 331, 348.1, 290, 332, 913

[56] References Cited

U.S. PATENT DOCUMENTS

| | | | |
|---|---|---|---|
| 2,856,394 | 10/1958 | Small et al. | 526/348.2 X |
| 3,481,908 | 12/1969 | Mortimer | 526/348.2 X |
| 3,518,237 | 6/1970 | Duck et al. | 526/348.2 X |
| 3,563,967 | 2/1971 | Chauvin et al. | 526/348.2 X |
| 3,847,888 | 11/1974 | Baumgaertner | 526/352 X |
| 4,205,021 | 5/1980 | Morita et al. | 526/348.2 X |
| 4,405,774 | 9/1983 | Miwa et al. | 526/348.2 X |
| 4,690,991 | 9/1987 | Seppälä | 526/348.2 X |

*Primary Examiner*—Joseph L. Schofer
*Assistant Examiner*—F. M. Teskin
*Attorney, Agent, or Firm*—Jordan B. Bierman

[57] ABSTRACT

Novel copolymers of ethylene containing per 100 parts by weight ethylene 0.2 to 5.0 parts by weight of 2,4,4-trimethylpentene-(1) and optionally 2.0 to 20 parts by weight of vinyl ester or vinyl ether or ester of acrylic acid or methacrylic acid with alcohols of 1 to 8 carbon atoms having a melt index MFI (190/2.16) of 0.4 to 20 g/10 min. a density of 0.915 to 0.960 g/ml and an impact tensile strength of 850 to 2,600 mJ/mm$^2$ and a process for their preparation useful for making transparent films.

14 Claims, No Drawings

COPOLYMERS OF ETHYLENE AND 2,4,4-TRIMETHYLPENTENE-1

DE-AS 2,018,718 describes a process for the preparation of modified high pressure polyethylene polymers where the polymerization of ethylene and optionally other compounds which can be copolymerized with ethylene takes place in the presence of oligomers of isobutylene which consist of 4 to 100 isobutylene units. The said polymers are suitable for the manufacture of films and the addition of oligomers of isobutylene prevents surface stickiness of the films, known as blocking.

If, on the other hand, disobutylene is used, non-homogeneous polymers are obtained and the films made from such materials are cloudy and exhibit specks (cf. DE-AS 2,018,718, col. 2, lines 32 to 38 and column 6, comparative Example 21). Therefore, they are unsuitable for packing purposes. Certain demands are placed on films which are used as packing material especially for goods to be stored at low temperature. They have to have high transparency, stiffness, luster and good impact tensile strength and these properties must also be retained at low temperatures.

It is an object of the invention to provide novel ethylene copolymers useful for films having excellent properties, even at low temperatures and their preparation.

It is another object of the invention to provide novel films of excellent properties.

These and other objects and advantages of the invention will become obvious from the following detailed description.

The novel copolymers of the invention are comprised of a copolymer of ethylene containing per 100 parts by weight of ethylene 0.2 to 5.0 parts by weight of 2,4,4-trimethylpentene-(1) and optionally 2.0 to 20 parts by weight of vinyl ester or vinyl ether or ester of acrylic acid or methacrylic acid with alcohols of 1 to 8 carbon atoms having a melt index MFI (190/2.16) of 0.4 to 20 g/10 min. a density of 0.915 to 0.960 g/ml and an impact tensile strength of 850 to 2,600 mJ/mm$^2$.

The binary copolymers contain per 100 parts by weight of ethylene 0.2 to 5.0, preferably 0.3 to 4.0, in particular 0.35 to 3.5 parts by weight of 2,4,4-trimethylpentene-(1). The ternary copolymers consist of ethylene, 2,4,4-trimethylpenten-(1) and a further monomer selected from the group consisting of vinyl ester, vinyl ether, acrylic acid ester or methacrylic acid ester. Vinyl ester and the ester of acrylic acid or methacrylic acid are particularly suitable as monomers. Acrylic acid ester and in particular vinyl ester are preferred.

Among the preferred vinyl esters are those whose carboxylic acid groups contain 2 to 4 carbon atoms, preferably vinyl acetate and the preferred vinyl ethers contain 4 to 8 carbon atoms. An example of these compounds is vinyl ethyl ether. The acrylic acid ester and methacrylic acid ester are derived from aliphatic alcohols of 1 to 8 carbon atoms in the molecule. The alcohols can be straight-chained or branched and carry the OH group on a primary, secondary or tertiary carbon atom. Methyl, ethyl and tertiary butyl acrylate as well as methacrylate have proved to be particularly suitable.

The ternary polymers contain per 100 parts by weight of ethylene 0.2 to 5.0, preferably 0.3 to 4.0 and in particular 0.35 to 3.5 parts by weight of 2,4,4-trimethyl-pentene-(1) and 2.0 to 20, preferably 2.2 to 15 and in particular 2.5 to 10 parts by weight of the afore-mentioned monomers. The copolymers of the invention are characterized by a melt index MFI (190/2.16) of 0.4 to 20.0, preferably 0.5 to 10.0 and particularly 0.6 to 4.0 g/10 min. The said melt indices are determined according to German standard DIN 53735. Empirically, an average mol mass determined by the process of gel permeation chromatography can be assigned to every melt index measured and the corresponding values can be taken from the following table.

| MFI 190/2.16 (g/10 min.) | Average mol. mass (g × mol$^{-1}$) |
| --- | --- |
| 16.0–20.0 | 20,000 |
| 3.0 | 70,000 |
| 2.0 | 100.000 |
| 0.8 | 120,000 |
| 0.4 | 140,000 |

The density of the copolymers is 0.915 to 0.960, preferably 0.920 to 0.945 and in particular 0.925 to 0.940 g/cm$^3$. The polymers are also defined by their impact tensile strength which ranges from 850 to 2,600, preferably 870 to 2,500 and in particular 900 to 2,200 mJ/mm$^2$. The impact tensile strength is determined according to German standard DIN 53448.

The novel binary and ternary ethylene copolymers can be prepared by copolymerization of the monomers at 50 to 350 mPa and 100 to 350° C. in the presence of oxygen or radical-forming compounds. Mixtures are polymerized from 100 parts by weight of ethylene, 0.4 to 10.0 parts by weight of 2,4,4-trimethylpentene-(1) and optionally 1.5 to 25.0 parts by weight of vinyl ester or vinyl ether or ester of acrylic acid or methacrylic acid and an aliphatic alcohol of 1 to 8 carbon atoms. As the polymerization rate of the monomers is generally different, the composition of the polymer often deviates from the composition of the monomer mixture.

Polymerization takes place at a pressure of 50 to 350, preferably 100 to 300, and in particular 125 to 275 mPa and the polymerization temperature is 100 to 300, preferably 120 to 325 and in particular 130° to 300° C.

Oxygen or radical-forming compounds are employed as polymerization initiators and the radical forming compounds include organic peroxides, hydroperoxides or azo compounds. Of the organic peroxides, tertiary butylperbenzoate, tertiary butylperoxypivalate and dilaurylperoxide have proved useful. Azo-bis(isobutylronitrile) has been successfully used as an azo compound. Tertiary butylperoxypivalate has proved to be particularly suitable. The compounds can all be used alone or as a mixture. The polymerization initiators are used in a concentration of 3 to 50, preferably 5 to 40, in particular 10 to 25 weight ppm based on the ethylene. They are added to the polymerization directly or as a solution in an organic solvent. Hydrocarbons such as isooctane, benzene, toluene or gasoline fractions serve as solvents.

An essential feature of the process for the new polymers of the invention is the absence of separate molecular mass regulators (moderators) during polymerization. Molecular mass regulators are compounds which are added to the monomers in various concentrations to influence the growth of the polymer molecule and thus the mol mass of the polymer. The mol mass regulators include members of a wide variety of substance classes. Examples are: hydrogen, alkanes, unbranched alpha olefins, alcohols, aldehydes, and ketones (cf. Fortschr. Hochpolym.-Forschg. 7(3), 386–448).

In this connection, it must be pointed out that diisobutylene, i.e. a mixture mainly consisting of 2,4,4-trimethylpentene-(1) and -(2), itself acts as a mol mass regulator (cf. Fortschr. Hochpolym.-Forschung 7(3), 417). Thus, monomer mixtures with a higher content of 2,4,4-trimethylpentene-(1) produce polymers with a lower mol mass than monomer mixtures in which the 2,4,4-trimethylpentene-(1) concentration is lower.

If polymerization takes place not only in the presence of 2,4,4-trimethylpentene-(1) but also in the presence of other mol mass regulators, polymers are obtained which are not suitable for the manufacture of films. The draw-down is particularly unsatisfactory. Moreover, the films exhibit specks and are useless as packing material owing to their lack of transparency. It was not to be foreseen that if the separate addition of a regulator apart from the comonomer 2,4,4-trimethylpentene-(1) acting simultaneously as a mol mass regulator was dispensed with, polymers would be formed which can excellently be processed to films with outstanding properties.

The monomer mixture reacted according to the invention process always contains 2,4,4-trimethylpentene-(1) with its content being 0.4 to 10.0, preferably 0.6 to 8.0, particularly 0.7 to 7.0 parts by weight per 100 parts of ethylene. 2,4,4-trimethylpentene-(1) can also be added to the polymerization reaction in the form of a mixture with other $C_8$ olefins. Diisobutylene is particularly suitable as a mixture containing 2,4,4-trimethylpentene-(1) mainly consisting of 2,4,4-trimethylpentene-(1) and 2,4,4-trimethylpentene-(2) which is formed during dimerization of 2-methyl-propene-(i-butylene) with acidic catalysts (e.g. ion exchangers). Depending on the manufacture, it contains 50 to 90, preferably 55 to 80 and in particular 60 to 75 parts by weight of 2,4,4-trimethylpentene-(1), in each case based on 100 parts by weight of diisobutylene.

Apart from ethylene and 2,4,4-trimethylpentene-(1), the monomer mixture polymerized by the process of the invention can contain other monomers including vinyl esters, vinyl ethers, acrylic acid esters and methacrylic acid esters. Their content in the monomer mixture is 1.5 to 25.0, preferably 2.0 to 20.0 and in particular 3.0 to 15.0 parts by weight, based on 100 parts by weight of ethylene. The residence period of the monomer mixture in the polymerization stage is 30 to 180, preferably 50 to 160 and in particular 60 to 140 seconds.

The process of the invention can be performed in high pressure reactors known for the polymerization of ethylene and ethylene-containing monomer mixtures. These include stirred autoclaves and tubular reactors (cf. Ullmann Enyclopadie der Technischen Chemie, 4. Auflage, Verlag Chemie Weinheim-Basel 1980, volume 19, page 169, 172–175). When a tubular reactor is used, the entire monomer mixture already containing initiators can be added in a stream to the reactor. However, it is particularly advantageous to use a tubular reactor with subsequent dosing of cold gas and initiator and to divide the monomer mixture into at least two partial streams. One partial stream is fed in at the reactor entrance and other partial streams are introduced into the reaction zone along the reactor mostly in the region of a peak temperature.

Films manufactured from the new copolymers have high strength (measured as impact tensile strength) and remarkable transparency which properties are retained even at low temperatures, such as those occuring when deep-freeze goods are stored. Moreover, the material is characterized by high draw-down (measured as the lowest film thickness which can be manufactured by drawing without the film tearing or holes appearing). It is 5 to 30, preferably 8 to 25 and in particular 10 to 20 μm.

In the following examples A to F the, new polymers and the process for their manufacture are explained in more detail. Examples 1 to 14 relate to comparative tests which show that observance of the claimed features (material properties and process parameters) are necessary to solve the task on which the invention is based. In the examples, 2,4,4-trimethylpentene-(1) is always used in the form of the mixture of various $C_8$ hydrocarbons which is designated diisobutylene and has the following composition:

|  | Weight-% |
|---|---|
| 2,4,4-trimethylpentene-(1) | 71.3 |
| 2,4,4-trimethylpentene-(2) | 22.0 |
| other isomers of trimethylpentene | 3.3 |
| 2,4,4-trimethylpentene trans-2,2-dimethylhexene-(3) | 1.8 |

It boils at 101° C. and its density $d^{20}$ is 0.711 g/cm$^3$.

The following processes were employed to determine the properties of the polymers.

Melt index MFI (190/2.16) g/10 min: measured by DIN 53735; impact tensile strength measured by DIN 53448; draw-down determined by processing of the copolymer on a blown-film machine. The throughput was 7 kg/h, the nozzle had a diameter of 1 mm, the blow-up ratio was 2.5:1; transparency: visual assessment of the films.

The 2,4,4-trimethylpentene-(1) share of the polymers was determined from the (gas chromatographically determined) difference between the 2,4,4-trimethylpentene-(1) content of the monomer mixture at the reactor entrance and the reactor exit. The vinyl acetate share of the polymers was determined by pyrolysis and measurement of the acetic acid liberated by aqueous iodide/iodate solution.

EXAMPLES A–F

The copolymers were manufactured in a continuously operated high-pressure reactor (stirred autoclave) downstream of which are a high-pressure gas separator and a low-pressure gas separator. The monomer mixture determined for the polymerization was brought to the desired pressure and fed into the high-pressure reactor. At the same time, the amount of polymerization initiator (tertiary butylperoxypivalate dissolved in gasoline) required to maintain the polymerization was added. The residence period of the reaction mixture in the high-pressure reactor was about 90 seconds. Reaction conditions, initiator concentration (related to the ethylene employed) and the composition of the monomer mixture are reported in Table 1 and the properties of the copolymers are reported in Table 2.

EXAMPLES 1 to 5 (Comparative tests)

Examples 1 to 5 were carried out in the same manner as the Examples A–F with the only difference being that the monomer mixture contained a separate mol mass regulator (moderator). The details of the tests performed are in Table 1. Composition and properties of the copolymers obtained according to Examples 1 to 5 are listed in Table 2.

Compared with the copolymers of Examples 1-5, the copolymers of Examples A-F of the invention exhibited a considerably increased impact tensile strength, an appreciably higher draw-down as well as significant improvement of the transparency. They are therefore particularly suitable for the manufacture of films.

EXAMPLES 6 to 14 (comparative tests)

If diisobutylene was not added but was replaced by standard molecular weight regulators, the products obtained were not suitable for the manufacture of films. The reaction conditions for the Examples 6 to 14 are in Table 1 and the properties of the resulting copolymers are in Table 2.

TABLE 1

Manufacture of copolymers

| Example | Pressure (MPa) | Temperature (°C.) | Initiator Type | Initiator Conc. (ppm) | $DIB^1$ | $VA^2$ | moderator Type | Qty. |
|---|---|---|---|---|---|---|---|---|
| A | 250 | 230 | a | 15 | 2.4 | — | — | — |
| B | 250 | 230 | a | 15 | 1.7 | — | — | — |
| C | 250 | 190 | a | 12 | 2.0 | — | — | — |
| D | 250 | 160 | a | 12 | 3.5 | — | — | — |
| E | 250 | 230 | a | 14 | 1.6 | 2.7 | — | — |
| F | 250 | 230 | a | 19 | 1.1 | 7.1 | — | — |
| 1 | 250 | 230 | a | 15 | — | — | aa | 2.1 |
| 2 | 250 | 230 | a | 13 | — | — | aa | 1.5 |
| 3 | 250 | 230 | a | 15 | 0.7 | — | bb | 0.2 |
| 4 | 250 | 230 | a | 12 | 0.9 | — | cc | 2.6 |
| 5 | 250 | 230 | a | 21 | 1.0 | 6.6 | cc | 1.6 |
| 6 | 250 | 230 | b | 11.5 | — | — | cc | 7.2 |
| 7 | 250 | 230 | c | 5 | — | — | aa | 2.3 |
| 8 | 250 | 230 | b | 38 | — | — | dd | 0.55 |
| 9 | 250 | 230 | d | 30 | — | — | bb | 0.2 |
| 10 | 250 | 230 | c | 5 | — | — | ee | 5.3 |
| 11 | 250 | 230 | c | 20 | — | — | ff | 0.3 |
| 12 | 250 | 230 | a | 25 | — | — | gg | 1.7 |
| 13 | 250 | 230 | a | 9 | — | — | hh | 2.3 |
| 14 | 250 | 230 | a | 27 | — | — | ii | 1.7 |

Initiators:
a: tert. butylperoxypivalate
b: isononanoylperoxide
c: tert. butylperoxy-3,5,5-trimethylhexanoate
d: bis(2-ethylvinyl)peroxydicarbonate
Moderators:
aa: propene
bb: propanal
cc: propane
dd: methylethylketone
ee: butene/butane 1:1
ff: cyclohexane
gg: n-hexene-1
hh: butanol
ii: n-octene-1
1: diisobutylene
2: vinylacetate

TABLE 2

Properties of the copolymers

| Example | Product composition (weight parts) ethylene | $TMP^1$ | $VA^2$ | MFI 190/2.16 (g/10 min) | Density (g/cm$^3$) | Impact tensile strength (mJ/mm$^2$) | Draw-down ($\mu$m) | Transparency * |
|---|---|---|---|---|---|---|---|---|
| A | 100 | 1.2 | — | 2.0 | 0.926 | 1075 | 14 | 1-2 |
| B | 100 | 1.0 | — | 0.6 | 0.925 | 1250 | 20 | 1-2 |
| C | 100 | 1.1 | — | 2.5 | 0.927 | 925 | 12 | 2 |
| D | 100 | 1.8 | — | 2.6 | 0.930 | 900 | 10 | 2 |
| E | 100 | 0.8 | 2.4 | 2.1 | 0.925 | 1350 | 15 | 2 |
| F | 100 | 0.6 | 6.2 | 2.2 | 0.927 | 1525 | 19 | 1-2 |
| 1 | 100 | — | — | 2.6 | 0.921 | 675 | 32 | 4 |
| 2 | 100 | — | — | 0.6 | 0.921 | 390 | 24 | 4 |
| 3 | 100 | 0.4 | — | 2.5 | 0.923 | 425 | 35 | 4 |
| 4 | 100 | 0.5 | — | 2.3 | 0.925 | 375 | 28 | 4 |
| 5 | 100 | 0.6 | 6.1 | 2.8 | 0.930 | 610 | 40 | 4 |
| 6 | 100 | — | — | 2.5 | 0.927 | 400 | —** | 3 |
| 7 | 100 | — | — | 2.6 | 0.921 | 390 | 22 | 3-4 |
| 8 | 100 | — | — | 2.8 | 0.927 | 370 | —** | 4 |
| 9 | 100 | — | — | 2.8 | 0.929 | 250 | —** | 3 |
| 10 | 100 | — | — | 2.6 | 0.925 | 410 | 50 | 4 |
| 11 | 100 | — | — | 2.6 | 0.927 | 400 | —** | 3-4 |
| 12 | 100 | —· | — | 2.4 | 0.926 | 390 | 20 | 3-4 |
| 13 | 100 | — | — | 2.3 | 0.926 | 390 | —** | 4 |

TABLE 2-continued

| | Properties of the copolymers | | | | | | | |
|---|---|---|---|---|---|---|---|---|
| | Product composition (weight parts) | | | MFI 190/2.16 | Density | Impact tensile strength | Draw-down | Trans-parency |
| Example | ethylene | TMP[1] | VA[2] | (g/10 min) | (g/cm$^3$) | (mJ/mm$^2$) | (μm) | * |
| 14 | 100 | — | — | 2.7 | 0.925 | 350 | 28 | 3 |

*Transparency:
1: excellent
2: good/satisfactory
3: unsatisfactory
4: deficient
**not measured
1 2,4,4-trimethylpentene-1
2 vinylacetate Various modifications of the copolymers and method of the invention may be made without departing from the spirit or scope thereof and it is to be understood that the invention is to be limited only as defined in the appended claims.

The embodiments of the invention in which an exclusive property or privilege is claimed are defined as follows:

1. A copolymer of ethylene containing, per 100 parts by weight of ethylene, 0.2 to 5.0 parts by weight of 2,4,4-trimethylpentene-(1) and optionally 2.0 to 20.0 parts by weight of at least one third member taken from the class consisting of vinyl esters, vinyl ethers, and esters of acrylic acid or methacrylic acid with aliphatic alcohols of 1 to 8 carbon atoms, said copolymer having a melt index MFI (190/2.16) of 0.4 to 20 g/10 min.

2. A binary copolymer of ethylene according to claim 1 containing 0.2 to 5.0 parts by weight of 2,4,4-trimethylpentene-(1) per 100 parts of ethylene.

3. A binary copolymer of ethylene of claim 2 containing 0.3 to 4.0 parts by weight of 2,4,4-trimethylpentene-(1) per 100 parts of ethylene.

4. A binary copolymer of ethylene of claim 2 containing 0.35 to 3.5 parts by weight of 2,4,4-trimethylpentene-(1) per 100 parts of ethylene.

5. A copolymer of claim 1 having a melt index of 0.5 to 10.0 g/min.

6. A copolymer of claim 1 having a melt index of 0.6 to 4.0 g/min.

7. A copolymer of claim 1 having a density of 0.920 to 0.945 g/ml.

8. A copolymer of claim 1 having a density of 0.925 to 0.940 g/ml.

9. A film made of a copolymer of claim 1.

10. A film made of a copolymer of claim 2.

11. A copolymer of ethylene containing, per 100 parts by weight of ethylene, 0.3 to 4.0 parts by weight of 2,4,4-trimethylpentene-(1) and 2.2 to 15.0 parts by weight of at least one third member taken from the class consisting of vinyl esters, vinyl ethers, and esters of acrylic acid or methacrylic acid with aliphatic alcohols of 1 to 8 carbon atoms, said copolymer having a melt index MFI (190/2.16) of 0.4 to 20 g/10 min.

12. A ternary copolymer of claim 11 containing 0.35 to 3.5 parts of 2,4,4-trimethylpentene-(1) and 2.2 to 15 parts of the third member per 100 parts of ethylene.

13. A ternary copolymer of claim 11 containing 0.35 to 3.5 parts of 2,4,4-trimethylpentene-(1) and 2.5 to 10 parts of the third member per 100 parts of ethylene.

14. A film made of a copolymer of claim 11.

* * * * *